(12) United States Patent
Bayrakeri (10) Patent No.: US 6,185,602 B1
(45) Date of Patent: Feb. 6, 2001

(54) MULTI-USER INTERACTION OF MULTIMEDIA COMMUNICATION

(75) Inventor: Sadik Bayrakeri, Foster City, CA (US)

(73) Assignee: Sony Corporation, Tokyo (JP)

( * ) Notice: Under 35 U.S.C. 154(b), the term of this patent shall be extended for 0 days.

(21) Appl. No.: 09/173,987

(22) Filed: Oct. 16, 1998

Related U.S. Application Data
(60) Provisional application No. 60/091,122, filed on Jun. 29, 1998.

(51) Int. Cl.$^7$ ........................................... G06F 13/00

(52) U.S. Cl. ................................................ 709/204

(58) Field of Search ........................... 709/200, 201, 709/203, 204, 205, 217, 218, 219

(56) References Cited

U.S. PATENT DOCUMENTS

| | | | |
|---|---|---|---|
| 5,179,665 | * 1/1993 | Roslund et al. | 709/215 |
| 5,649,104 | * 7/1997 | Carleton et al. | 709/204 |
| 5,745,688 | * 4/1998 | Oka | 709/204 |
| 5,822,525 | * 10/1998 | Tafoya et al. | 709/204 |
| 5,828,838 | * 10/1998 | Downs et al. | 709/204 |
| 5,844,553 | * 12/1998 | Hao et al. | 345/329 |
| 5,844,979 | * 12/1998 | Raniere et al. | 379/202 |
| 5,894,305 | * 4/1999 | Needham | 345/329 |
| 5,933,597 | * 8/1999 | Hogan | 709/204 |
| 5,940,082 | * 8/1999 | Brinegar et al. | 345/442 |
| 5,951,637 | * 9/1999 | Kuzma | 709/204 |

OTHER PUBLICATIONS

Roehl, Bernie, et al. Late Night VRML 2.0 with Java Chapter 5, "The External Authoring Interface", written by Justin Couch. pp. 61–71.

Eleftheriadis, Alexandros, et al. "Text for CD 14496–1 Systems". International Organisation for Standardisation Organisation Internationale de Normalisation ISO/IEC JTC1/SC29/WG11 Coding of Moving Pictures and Audio. Nov. 21, 1997. pp. 1–206.

Westerink, Peter. Text for VM3.1 Systems Version 2 (MPEG–J). International Organisation for Standardisation Organisation Internationale de Normalisation ISO/IEC JTC1/SC29/WG11 Coding of Moving Pictures and Audio. Dublin/Jul. 1998. pp. 1–61.

Vaananen, Riitta. "Working Draft of Advanced BIFS (Systems WD subpart 2)". International Organisation for Standardisation Organisation Internationale de Normalisation ISO/IEC JTC1/SC29/WG11 Coding of Moving Pictures and Audio. Jul. 1998. pp. 1–42.

Koenen, Rob. MPEG–4 Overview—(Dublin Version). International Organisation for Standardisation Organisation Internationale de Normalisation ISO/IEC JTC1/SC29/WG11 Coding Moving Pictures and Audio. Jul. 1998/Dublin. pp. 1–45.

* cited by examiner

Primary Examiner—Moustafa M. Meky
(74) Attorney, Agent, or Firm—Sony IPD (57) ABSTRACT

The present invention provides multi-user interaction for multimedia communication. In one embodiment, a process for multi-user interaction for multimedia communication includes generating a message on a local user machine, the message including object-based media data (i.e., streamed, digital audio data or streamed, digital video data or both), and transmitting the message to a remote user machine, in which the local user machine displays a scene that includes the object-based media data, the scene being shared by the local user machine and the remote user machine. The remote user machine constructs the message using a message handler class. In one embodiment, the multi-user inter-action for multimedia communication is an extension to MPEG-4 Version-1.

27 Claims, 7 Drawing Sheets

MULTI-USER INTERACTION OF MULTIMEDIA COMMUNICATION

CROSS-REFERENCE TO RELATED APPLICATIONS

This patent application is related to co-pending provisional application entitled, "MULTI-USER INTERACTION PROTOCOL USING JAVA AND MPEG-4", to Sadik Bayrakeri,, filed Jun. 29, 1998, Ser. No. 60/091,122, the disclosure of which is incorporated herein by reference in its entirety, and the benefit of whose priority is hereby claimed under 35 USC 119(e).

COPYRIGHT NOTICE

A portion of the disclosure of this patent document contains material that is subject to copyright protections. The copyright owner has no objection to the facsimile reproduction of the patent document or the patent disclosure, as it appears in the Patent and Trademark Office patent file or records, but otherwise reserves ail copyright rights whatsoever.

BACKGROUND

1. Field of the Invention

The present invention relates generally to communication technology and, more particularly, to multi-user interaction for multimedia communication.

2. Background of the Invention

Multi-User Interaction (MUI) over the Internet has become increasingly popular. For example, virtual chat rooms allow multiple users to interact via text-based communication over the Internet. Multiple users see the text-based messages sent by all other users in the chat room and can send their own text-based message as well, which is then broadcast to all of the other users in the chat room.

Multimedia computing involves the processing and display of digital multimedia data, such as audio, computer graphics, or video data. A variety of standard multimedia protocols have been developed. For example, Moving Pictures Expert Group (MPEG) has developed MPEG-1 (coding of multimedia for digital storage media) and MPEG-2 (coding of moving video and associated audio for digital storage media, television broadcasting, and communication) standards.

MPEG is currently developing an object-based multimedia standard called MPEG-4 for lower bandwidth communication environments, such as the Internet. MPEG-4 defines the bit stream syntax and decoder semantics of encoded media. Version 1 (systems level) of MPEG-4 will be an International Standard in December of 1998. MPEG-4 is directed to a standard for providing single-user object-based multimedia communication from disk, CD-ROM, or via a network (e.g., the World Wide Web (WWW)).

SUMMARY OF THE INVENTION

MPEG-4 represents an example of a media streaming technology for communicating digital multimedia over networks, such as the Internet (using the Internet Protocol), ATM (Asynchronous Transfer Mode) networks, mobile networks, or the PSTN (Public Switched Telephone Network). MPEG-4 (Version 1) is directed to a client-server architecture for object-based media broadcast in which a media server is generally assumed. However, MPEG-4 (Version 1) only supports single-user interaction.

Accordingly, the present invention provides Multi-User Interaction (MUI) (i.e., at least two users interacting with each other dynamically, such as interacting with a shared scene, through servers or directly client-to-client) for multimedia communication. For example, the present invention provides a cost-effective and high-performance MUI protocol for MPEG-4 communication over the Internet. MUI for multimedia communication can be applied in a variety of application domains, such as collaborative computing, distance learning, shared virtual worlds, virtual chat rooms, entertainment, and E-commerce (Electronic-commerce), which involves interaction of two or more users with each other.

In one embodiment, a process for multi-user interaction for multimedia communication includes generating a message on a local user machine, the message including object-based media (i.e., streamed, digital audio or digital video or both) data, and transmitting the message to a remote user machine, in which the local user machine displays a scene that includes the object-based media data, the scene being shared by the local user machine and the remote user machine. The remote user machine instantiates the transmitted message using a message handler class. In one embodiment, the multi-user interaction for multimedia communication is an extension to MPEG-4 Version-1.

In one embodiment, the process further includes instantiating the message on the local user machine using a message class, in which the message class provides Multiple messages of variable types. The message class and the message handler class can be implemented in a JAVA programming language, which allows for a dynamic and flexible MUI protocol for multimedia communication over a network, such as the Internet.

Other aspects and advantages of the present invention will become apparent from the following detailed description and accompanying drawings.

DETAILED DESCRIPTION OF THE INVENTION

Figure 1:
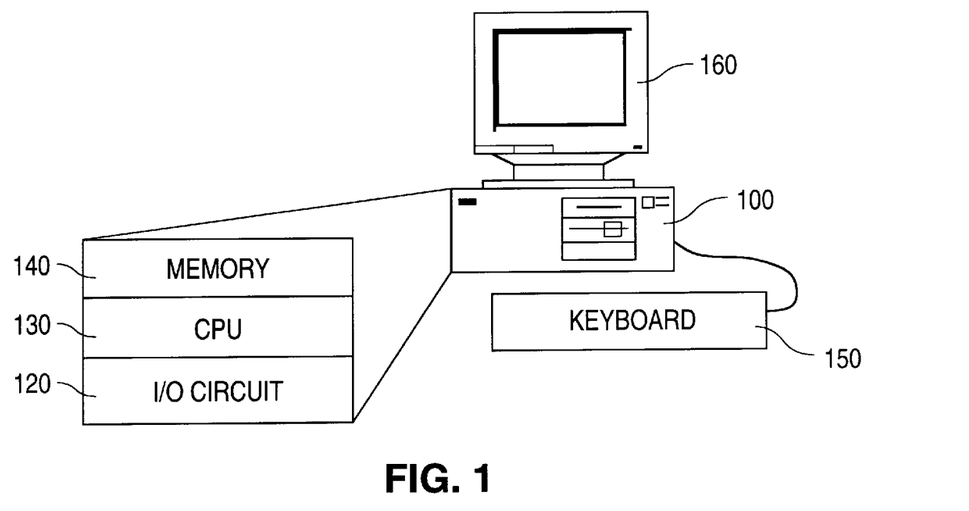
FIG. 1 is a block diagram of a data processing system in accordance with one embodiment of the present invention.

FIG. 1 illustrates a data processing system in accordance with one embodiment of the present invention. FIG. 1 shows a computer 100, which includes three major elements. Computer 100 includes an input/out (I/O) circuit 120, which is used to communicate information in appropriately structured form to and from other portions of computer 100 and other devices or networks external to computer 100. Computer 100 includes a central processing unit (CPU) 130 (e.g., a microprocessor) in communication with I/O circuit 1210 and a memory 140 (e.g., volatile and non-volatile memory). These elements are those typically found in most general purpose computers and, in fact, computer 1100 is intended to be representative of a broad category of data processing devices.

A raster display monitor 160 is shown in communication with I/O circuit 120 and issued to display images generated by CPU 130. Any well-known type of cathode ray tube (CRT) display or other type of display can be used as display 160. A conventional keyboard 150 is also shown in communication with I/O 120.

It will be appreciated by one of ordinary skill in the art that computer 100 can be part of a larger system. For example, computer 100 can also be in communication with a network, such as connected to a local area network (LAN) or the Internet.

In particular, computer 100 can include circuitry that implements Multi-User Interaction (MUI) for multimedia communication in accordance with the teachings of the present invention. In one embodiment, as will be appreciated by one of ordinary skill in the art, the present invention can be implemented in software executed by computer 100 (e.g., the software can be stored in memory 140 and executed on CPU 130), as further discussed below.

Figure 2:
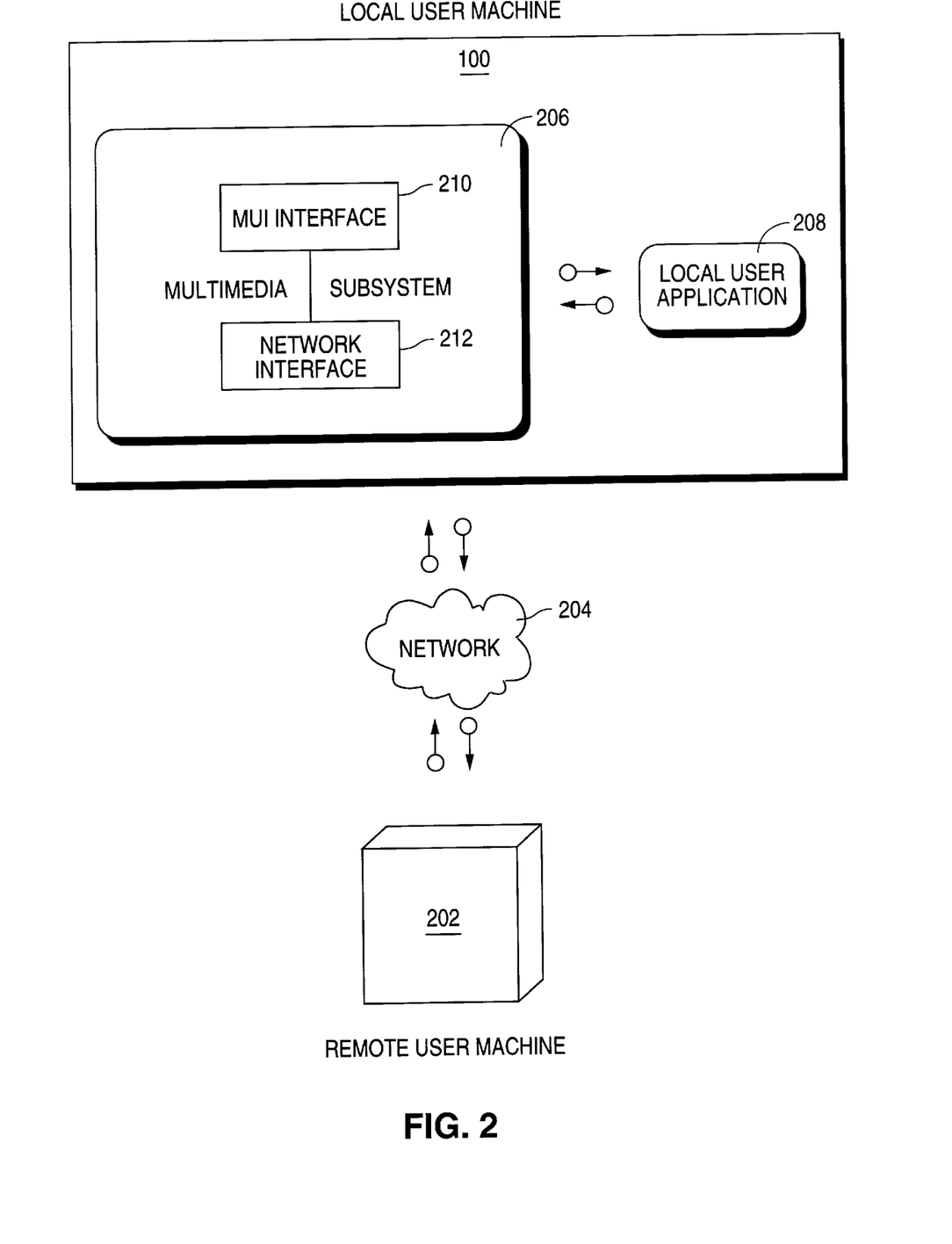
FIG. 2 is a block diagram of a multi-user system for multimedia communication in accordance with one embodiment of the present invention.

FIG. 2 is a block diagram of a multi-user system for multimedia communication in accordance with one embodiment of the present invention. A local user machine 100 is in data communication with a remote user machine 202 via a network 204, such as the Internet.

Local user machine 100 functions as a client and includes a multimedia subsystem 206. Local user machine 160 also includes a local user application 208. Multimedia subsystem 206 includes an MUI interface 210 and a network interface 212. Local user application 208 is a multimedia application, which interacts with multimedia subsystem 206. Multimedia subsystem 206 interacts with network 204 to transmit and receive multimedia (media) data.

In particular, network interface 212 handles multimedia communication with network 204. For example, Network interface 212 establishes a channel for multimedia communication (e.g., using MPEG-4) with a media server via the Internet.

MUI interface 210 handles MUI messaging between local user machine 100 and remote user machine 202. For example, if the local user inserts a new media object in a shared scene that is being viewed by both the local user and the remote user, then MUI interface 210 sends a message to remote user machine 202 to add the new media object. The message, which is sent to remote user machine 202, can include the new media object. If the message does not include the new media object (assuming the new media object resides on the media server), then the message is sent to the media server as a request to transmit the new media object to remote user machine 202. Messages can also include control information or state information. Multimedia subsystem 206 is further discussed below particularly with respect to FIGS. 5 and 6.

Figure 3:
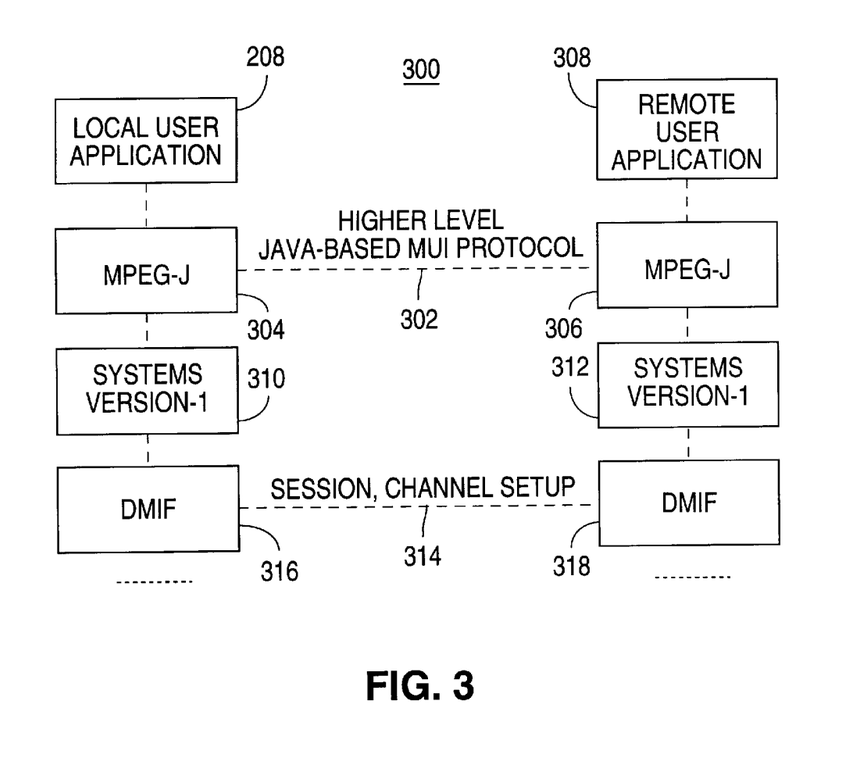
FIG. 3 is a block diagram of a multi-user-computing environment using JAVA and MPEG-4 in accordance with one embodiment of the present invention.

FIG. 3 is a block diagram of a multi-user-computing environment 300 using JAVA and MPEG-4 in accordance with one embodiment of the present invention. DMIF (Delivery Multimedia Integration Framework) is defined in MPEG-4. DMIF provides a session protocol for the management of multimedia streaming over generic technologies (e.g., over the Internet, or locally from disk or CD-ROM). Systems Version-1 is a systems layer of MPEG-4 that wraps media to provide efficient inter-media, intra-media, and user-to-media access and interaction. MPEG-J is a JAVA-based implementation of an MPEG-4 system that provides additional control functionality to Systems Version-1. In particular, MPEG-J is a programmatic system (as opposed to the parametric system offered by MPEG-4 Version 1), which specifies an API (Application Program Interface) for interoperation of MPEG-4 media players with JAVA code. Systems Version-1 and DMIF provide a network interface, such as network interface 212.

FIG. 3 illustrates a local MPEG-J 304 and a remote MPEG-J 306, which are each extended to provide an MUI interface, such as MUI interface 210. A communication link 302 is established between local MPEG-J 304 and remote MPEG-J 306. Local MPEG-J 304 interacts with local user application 208, and remote MPEG-J 306 interacts with a remote user application 308. MPEG-J 304 and MPEG-J 306 handle multi-user interaction functionality for a Systems Version-1 310 and a Systems Version-1 312, respectively. In particular, MPEG-J 304 and MPEG-J 306 each provide a JAVA-based MUI protocol to provide interaction between two or more MPEG-4 terminals.

A session, channel setup link 314 is established between a local DMIF 316 and a remote DMIF 318. In contrast, the JAVA-based MUI protocol is at the MPEG-J level rather than at the Systems-Version 1 level. Media data and control information are exchanged between the local MUI system and the remote MUI system via MPEG-J 304 and MPEG-J 306, respectively. For example, a server can be implemented as an MUI system to receive media data and control information from a client MUI system. The JAVA-based MUI protocol is flexible, extensible, and distributable so that it allows for the design and exchange of variable type messages, as will be described in greater detail below.

In MUI system 300, local user application 208 and remote user application 308 can share the same scene. MUI protocol 302 allows the local user and the remote user to share and interact with the same scene. In particular, MUI protocol 302 provides concurrency control using status messages, which means that the ownership or control of a media object is allocated to one of the users when both attempt to modify the same media object.

For example, MUI system 300 can be used to implement a virtual shopping mall. The virtual shopping mall can be represented by a scene graph, such as an MPEG-4 BIFS (Binary Format for Scene) scene, which is shared by a local machine and a remote machine. MPEG-4 BIFS provides a wrapping of object-based media by BIFS scene description as defined in MPEG-4 (Version-1), which allows for efficient intramedia, inter-media, and user-media interactions. Each shop in the virtual shopping mall is a sub-scene. In one embodiment, each shop is implemented as a separate MUI system in which each MUI-system scene description is implemented locally without any reference to a remote MUI-system scene description. Accordingly, global extensibility and more efficient scene description are provided, and network access transparency and object access transparency between MUI systems are provided, as further discussed below.

Figure 4:
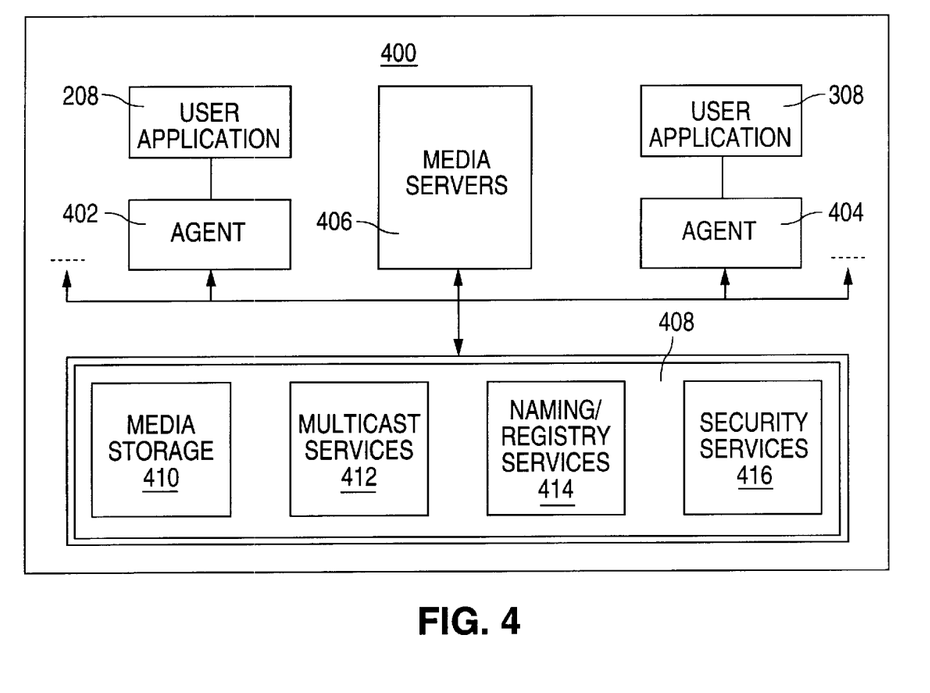
FIG. 4 is a block diagram of a multi-user-computing environment including media servers in accordance with one embodiment of the present invention.

FIG. 4 is a block diagram of a multi-user-computing environment including media servers in accordance with one embodiment of the present invention. FIG. 4 shows a flexible MUI infrastructure in which user agents 402 (e.g., multimedia subsystem 206) and 404 interact with each other via media servers 406. One of ordinary skill in the art will recognize that a variety of distributed system approaches can be provided for an efficient multimedia protocol to send and receive information between user agents 402 and 404, in which the services are provided to MUI systems. For example, depending on the application framework, central media servers can be used to handle data flow to agents to increase performance. However, if the number of agents increases, the central media servers may become a bottleneck.

A set-of services 408 is provided to support the MUI computing environment of FIG. 4. Services 408 include media storage services 410 to store persistent data, multicast services 412 to communicate information between multiple agents, naming/registry services 414 to identify participating agents and media objects, and security services 416 for authentication and access control of media objects for security reasons. Services 468 can be implemented as global, local, distributed, or central services. For example, services 468 can be provided by central servers, distributed to local servers, or assigned to clients themselves. In one embodiment, each functionality or service is represented in component form and dynamically distributed in global system 400 to achieve optimum performance for the appropriate user application.

Figure 5:
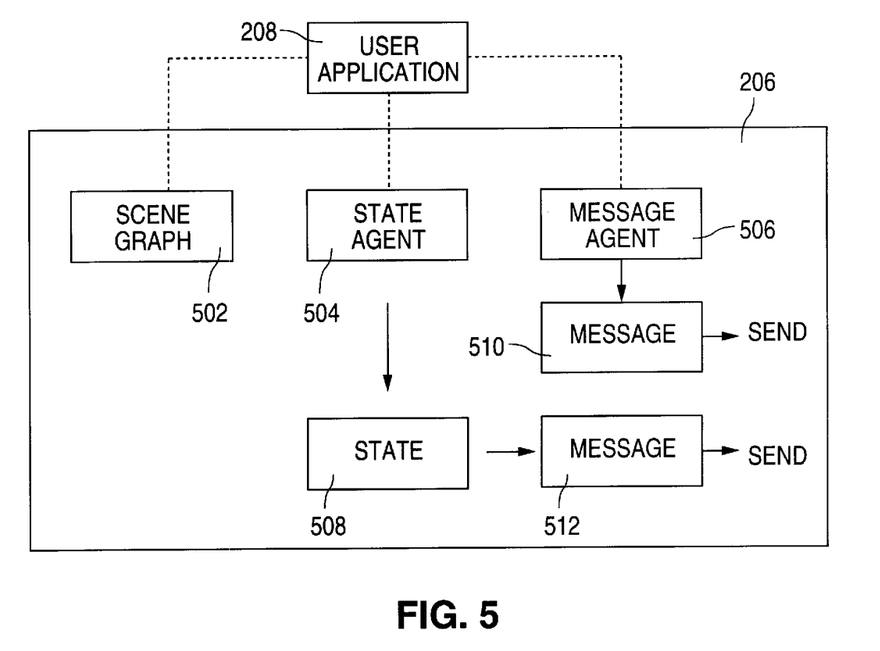
FIG. 5 is a block diagram of the multimedia subsystem of FIG. 2 shown in greater detail in accordance with one embodiment of the present invention.

FIG. 5 is a block diagram of the multimedia subsystem of FIG. 2 shown in greater detail in accordance with one embodiment of the present invention. In one embodiment of an MUI system for multimedia communication, users can share their scene with other users, exchange files, send each other confirmations or requests, or send messages to update other users shared scenes. Multimedia subsystem 206 includes a scene graph (e.g., a BIFS scene description) 502, a state agent 504 (e.g., of MUI interface 210), and a message agent 506 (e.g., of MUI interface 210), which allot for the sharing of a scene with other users, exchange of files with other users, and exchange of messages with other users. The term, agent, is used herein to refer to a functional entity, such as a user agent, stare agent, and message agent. In one embodiment, these agents can be dynamically distributed in the global system at runtime.

In particular, state agent 504 extracts and maintains state information 508 of shared media objects. For example, in a shared environment, the local scene graph is modified if the state of another user's shared scene is modified. In this event, message agent 506 sends, creates, and receives arbitrary messages at runtime, including handling shared media object state changes. Message agent 506 sends messages 510 and 512. Messages 510 and 512 can include object-based media data, state information 508, control information, or any combination thereof.

In one embodiment, state agent 504 can access or modify scene graph 502. State agent 504 also can define, extract, and maintain shared states/state changes.

Figure 6:
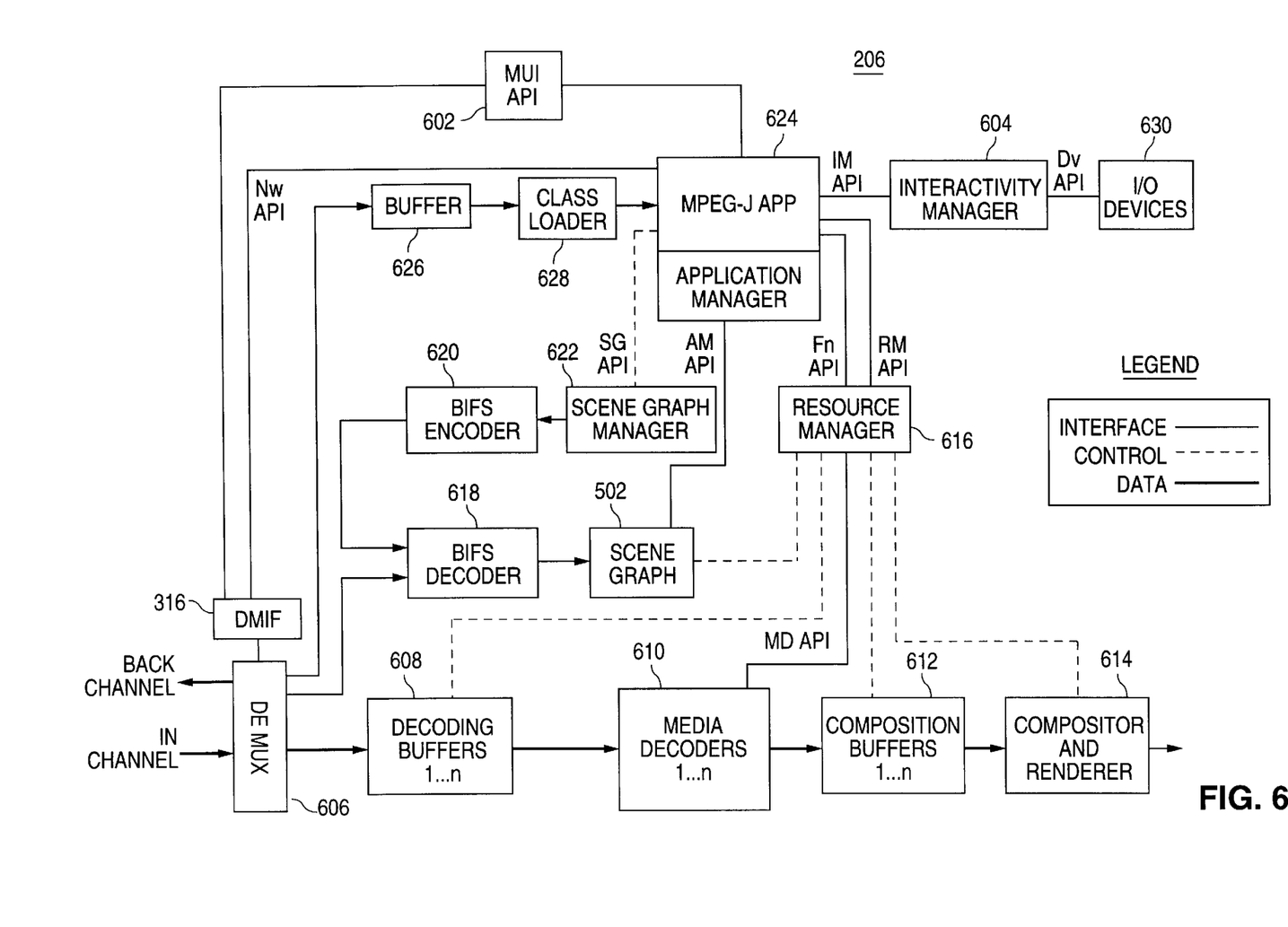
FIG. 6 is a block diagram of the multimedia subsystem of FIG. 2 shown in even greater detail in accordance with one embodiment of the present invention.

FIG. 6 is a block diagram of the multimedia subsystem of FIG. 2 shown in even greater detail in accordance with one embodiment of the present invention FIG. 6 depicts a programmatic MPEG-J player, which includes an MUI API 602 and interactivity manager 604 for MUI functionality, and a parametric MPEG-4 system player (lower half of FIG. 6 as described below), which is also referred to as the presentation engine.

The parametric MPEG-4 system player receives an incoming data stream via an in channel at demultiplexer (demux) 606 The retrieval of incoming data streams includes two tasks. First, the channels are located and opened. A transport control agent (not shown) manages tables and associates transport channels to specific elementary streams. Second, the incoming data streams are properly demultiplexed to recover SL (Synchronized Layer)-packetized streams from downstream channels (incoming at the receiving terminal) to be passed onto decoding buffers 608. For interactive applications, such as MUI systems, a corresponding multiplexing stage will multiplex upstream data in upstream channels (outgoing from the receiving terminal). Decoding buffers 608 and media decoders 610 are part of the elementary stream interface. The elementary stream interface receives demultiplexed elementary streams from demultiplexer 606 (e.g., elementary streams of object data representation and scene description information), decodes digital media data, and passes the decoded media data to composition buffers 612. Compositor and renderer 614 renders an appropriate MPEG-4 scene based on the received media object data representation and scene description information.

The programmatic MPEG-J player includes a resource manager 616. Resource manager 616 is used for regulation of performance: it provides a centralized facility for managing resources. The programmatic MPEG-J player also includes an external authoring interface API, which includes a BIFS decoder 618, a scene graph 502, a BIFS encoder 620, and a scene graph manager 622. BIFS decoder 618 decodes BIFS scene data received from demux 606 (or from BIFS encoder 620 via scene graph manager 622) to generate scene graph 502. Scene graph 502 is provided to resource manager 616 and to the application manager of MPEG-J APP 624. MPEG-J APP 624 receives JAVA code data via a buffer 626 and a JAVA class loader 628. MPEG-J APP 624 transmits control information to I/O devices 630 via interactivity manager 604.

MPEG-J APP 624 is also in data communication with MUI API 602, which is in data communication with the back channel and in channel. MUI API 602 includes state agent 502 and message agent 504. MUI API 602 provides for flexible interaction of MUI systems. MUI API 602 supports user-to-user and user-to-server interactions. Alternatively, interactivity manager 604 can include message agent 504.

In one embodiment, the scene graph API (SG API) can be used to modify scene graph 502, and state agent 504 of MUI API 602 can wrap any state changes in a message using message agent 506 of MUI API 602. For example, a message can be created with a single or multiple ROUTE arguments where the required tasks are loaded into the performTask method of the message class, as discussed below with respect to FIG. 7. After the message object is constructed, the performTask method can invoke the necessary scene access API methods. Note that the BIFS update/anim mechanisms in System Version-i of MPEG-4 or other update/anim structures can be defined as a message type using MUI API 602 (message types are discussed below with respect to FIG. 7).

Figure 7:
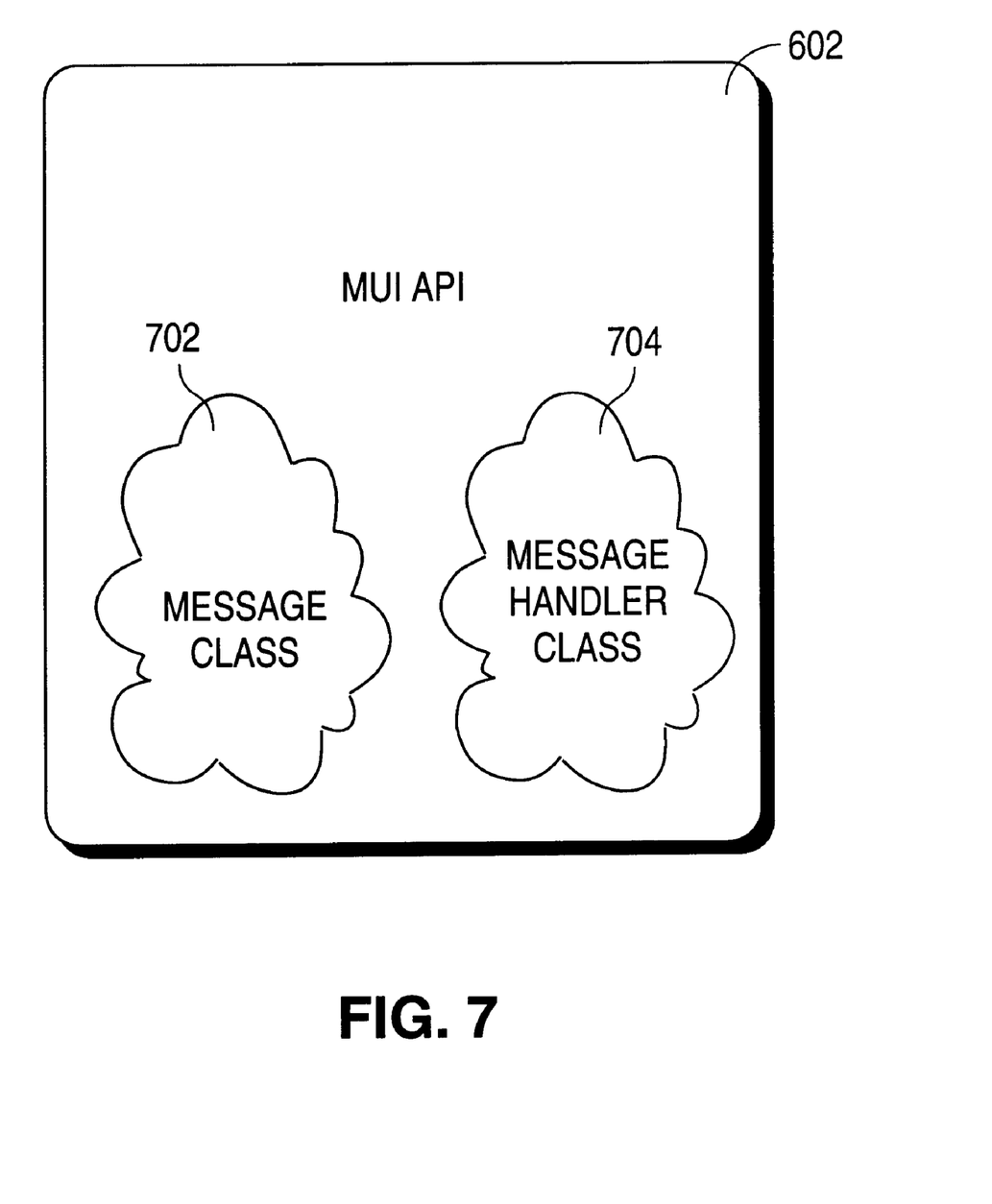
FIG. 7 is a block diagram of the MUI API of FIG. 6 shown in greater detail in accordance with one embodiment of the present invention.

FIG. 7 is a block diagram of the MUI API of FIG. 6 shown in greater detail in accordance with one embodiment of the present invention. MUI API 602 includes a message class 702 and a message handler class 704. MUI API 602 uses message class 702 to generate (i.e., instantiate) messages to be sent to other users (i.e., client-to-client messaging) or media servers (i e., client-to-server (-to-client) messaging). MUI API 602 uses message handler class 704 to generate messages received from other users or media servers. In one embodiment, message class 702 and message handler class 704 are implemented in the JAVA programming language.

MUI API 602 receives and sends messages in which each message includes a messageId and a set of arguments. For example, a message can include instructions to move a media object from one location in a shared scene to another location in the shared scene. In a dynamic MUI environment, message types can have variable (data) types as follows:

1. arguments of different data types,
   a message type={messageId argument1-float argument2-object}
   where the first argument type is float, and the second argument is an object of a class.
2. arguments with changing data types,
   a message type={messageId argument1-int argument2-float argument3-int}
   same message type={messageId argument1-string argument2-float argument3-object}
   The same message type is delivered with different argument types (e.g., argument1 can be either the social security number of a ser or the name of the user, either of which ,can be used for identification of the user).
3. variable number of arguments,
   a message type={messageId argument1}
   same message type={messageId argument1 argument2 ... }

For example, the message can be the list of participating users in an MUI environment, which can change at runtime.

Any of the above message types can be applied in combination to a message type. Also, a variety of other message types can be provided as would be apparent to one of ordinary skill in the art. In addition, message types in a message protocol may be updated or totally changed at runtime.

Message class 702 and message handler class 704 each support the above-described messages types. A message is instantiated using a local message class and transmitted from a local user/server to a remote user/serves. A remote message handler class checks the messageId End constructs (i.e., instantiates) the message object as an instance of the message class corresponding to the received message type.

In support of the first message type, message class 702 includes a read method so that each message object knows how to parse its own arguments. Thus, message class 702 provides modularity so that the message protocol can be updated without making any changes to the message handlers. Also, the message handler is not forced to know all possible argument types, some of which may only be available at runtime.

In support of the second message type in which the type of arguments can change, the message object needs to know the type of an argument and how to parse it. Thus, a message type includes flags to indicate an argument type assuming the argument type can take a value in a limited set of data types. If each argument of each message type in a message protocol can take values from a large set of data types, then the use of flags may consume a large bandwidth, and it may be more efficient to tag each argument with its type information. However, tagging each argument with type information can complicate the message update process.

In support of the third message type, an end_of_arguments token at the end of the message is provided. However, if the variable aspects of the second and third message type are combined, then each message type can take values from a large set of data types. Accordingly, the above-described messages of variable types as well as other message types can be efficiently resolved by extending message class 702 and message handler class 704 with the appropriate functionality (e.g., using JAVA-implemented classes, which provide inheritance and flexibility). For example, message types can be added to the message protocol at runtime. In support of message types added to the message protocol at runtime, methods are provided in message handler class 704 to keep a list of message types and add message types at runtime.

In one embodiment, the syntax and semantics of message class 702 and message handler class 704 of MUI API 602, in which MUI API 602 is implemented in interactivity manager 604, are provided as follows:

Import java.util.Vector
Class mpgj.sys.InteractivityManager
public abstract class Message
Constants and Variables
public int messageId
public Vector argumentList
Constructors
public Message( )
  The extended sub-classes of message class 702 can include constructors with references to MPEG-J API's such as the Scene Graph API or classes/methods of the user application.
Methods
public abstract int setMessageId (int id)
  Sets a messageId for a message.
public abstract int getMessageId ( )
  Returns the messageId of a message type.
public abstract void addMessageArguments
  Adds an argument to the message argument list. The message arguments may be of any type, including objects belonging to a class.
public abstract Vector getMessageArgumentList ( )
  Returns a list of message arguments.
Public abstract boolean readMessageArguments ( )
  Message class 702 reads its own arguments, which solves the problem of arbitrary message arguments that may not be known in advance. Placing this method in a message object, instead of message handler class 704, eliminates the requirement for message handler class 704 to know the format of all message types. Message objects parsing their own arguments provides flexibility for future changes in the message protocol. The message format can support both MPEG-4 Version-1 with access unit packets/time stamps and also access units without time stamps. Message format support of the latter is particularly important for multicast type message distribution. The time base of the message streams can also be converted to the receiver time base as provided in MPEG-4 Version-1.
abstract boolean performtask
  Perform the task based on the contents of message arguments.

Class mpgj.sys.InteractivityManager
public abstract class MessageHandler
Constants and Variables
public Vector messageTypes
   A list of message types in the current message protocol is maintained.
Constrictors
   public MessageHandler ( )
Methods
   public abstract boolean addMessageType (Message messagetype)
      Adds a new message type to the messageTypes list.
   public abstract Vector getMessageTypeList
      Returns a list of message types in the message protocol.
   public abstract boolean checkMessageType (int messdgeId)
      Checks if the message type with the messageId is in messageTypes list and returns true if the message type is in the list.
   public abstract Message receiveMessage ( )
      Reads a messageId and calls the checkMessageType method. If the message type is in the messageTypes list, then the method calls the constructor method of the message type. Next, the method calls the readMessageArguments and performTask methods of the constructed (e.g., instantiated) message object. At runtime, the messages are received from the agents at channels with channelId's and user agentId's returned by the multiAgentConnection method.
   public abstract void sendMessage ( )
      The method provides messages in suitable format so that readMessageArguments of a message object can parse the message. At runtime, the messages are sent to the agents at channels with channelId's and user agentId's returned by the multiAgentConnection method.
   public abstract (type channelId agentId) multiAgentConnection ( )
      The method calls the Network API to request multiple channels to be setup in order to send a message to one or more user agents or receive messages from one or more user agents. Assignment of channel id and user agent id can be performed at runtime by the Network API with reference to a global naming service. The method returns channelId's and user agentId's for interaction.

The proposed classes can be extended and implemented in a way suitable for a particular MUI application as would be apparent to one of ordinary skill in the art. The distribution of extended sub-classes to servers and clients is also viewed as application-specific. For example, the provided classes can be extended to operate with messages having a constant number of arguments and predefined argument types if limited interaction is acceptable in a back channel. However, the provided classes can be extended in any manner that an application requires for highly interactive environments with heavily utilized upstream channels Further, other classes can be added to MUI API 602.

Accordingly, an MUI API that supports MUI for multimedia communication is provided in accordance with one embodiment of the present invention. A flexible and dynamic MUI API, such as a JAVA-based MUI API 602 that includes message class 702 and message handler class 704, advantageously allows interaction to affect a scene description using messaging (of a variable type) outside of the actual scene description. Moreover, the JAVA-based MUI API is efficient and allows for MUI without unnecessarily increasing scene description complexity.

Figure 8:
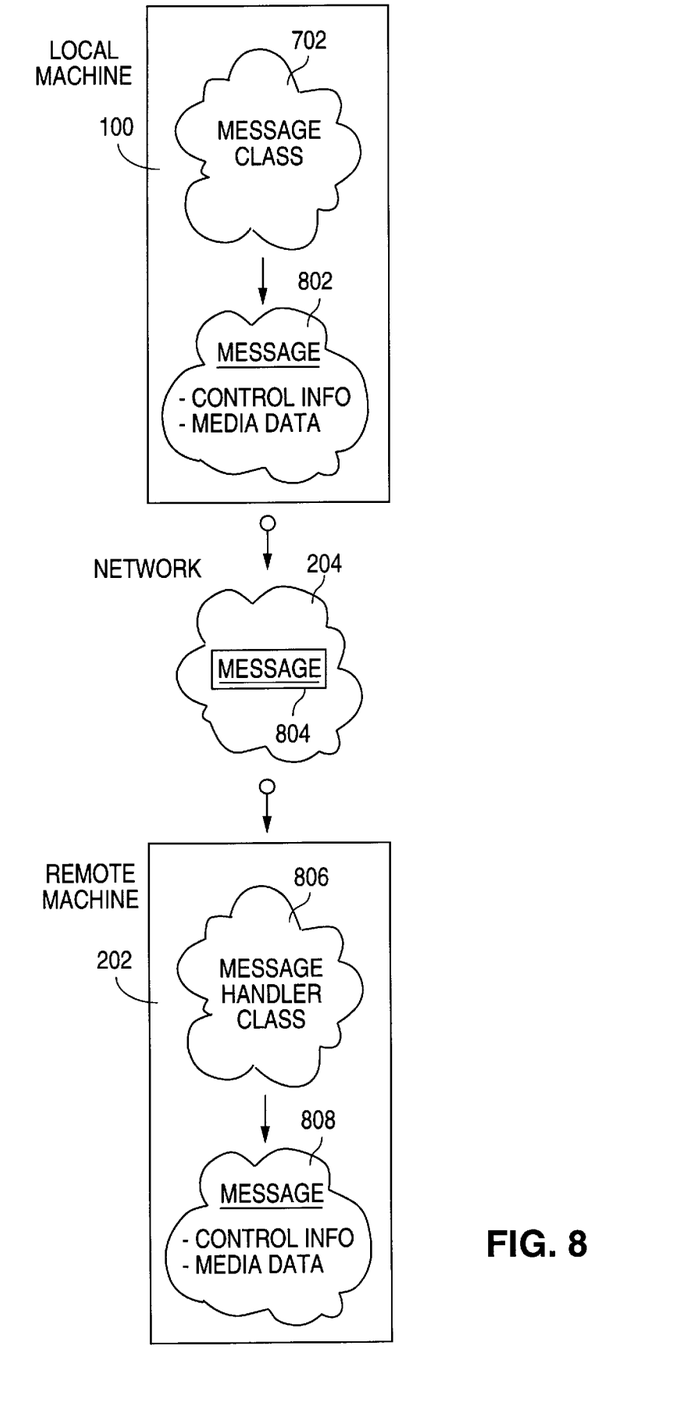
FIG. 8 is a functional diagram of object-based multimedia messages transmitted across a network based on an MUI protocol for multimedia communication in accordance with one embodiment of the present invention.

FIG. 8 is a functional diagram of object-based multimedia messages transmitted across a network based on an MUI protocol for multimedia communication in accordance with one embodiment of the present invention. Local user machine 100 includes message class 702. Message class 702 instantiates a message object 802. Message object 802 includes control information and media data (i.e., streamed, digital audio data or streamed, digital video data or both). For example, message object 802 can include a new media object and control information regarding the location of the new media object in a shared scene (i.e., a scene shared by local machine 100 and remote (user) machine 202) Generally, message 802 can include control information, object-based media data, file data for an exchange of files between the local user and the remote user, confirmation data, status information, or any other data that supports an MUI environment. Message object 802 is transmitted to remote machine 202. The transmission can be a client-to-client transmission or a client-to-server (-to-client) transmission. In particular, message object 802 is wrapped in the appropriate protocol (e.g., DMIF and IP) and transmitted as a data signal over network 204 as indicated by a message 804. Remote machine 202 receives message 804. Message handler class 806 of remote machine 202 instantiates a message object 808, which includes the control information and new media object data of the transmitted message 802. For example, at this point, the MPEG-J APP of remote machine 202 can appropriately process the control information and new media object data to update the shared scene at remote machine 202 using the methods of the instantiated message object 808 as discussed above with respect to FIG. 7.

Figure 9:
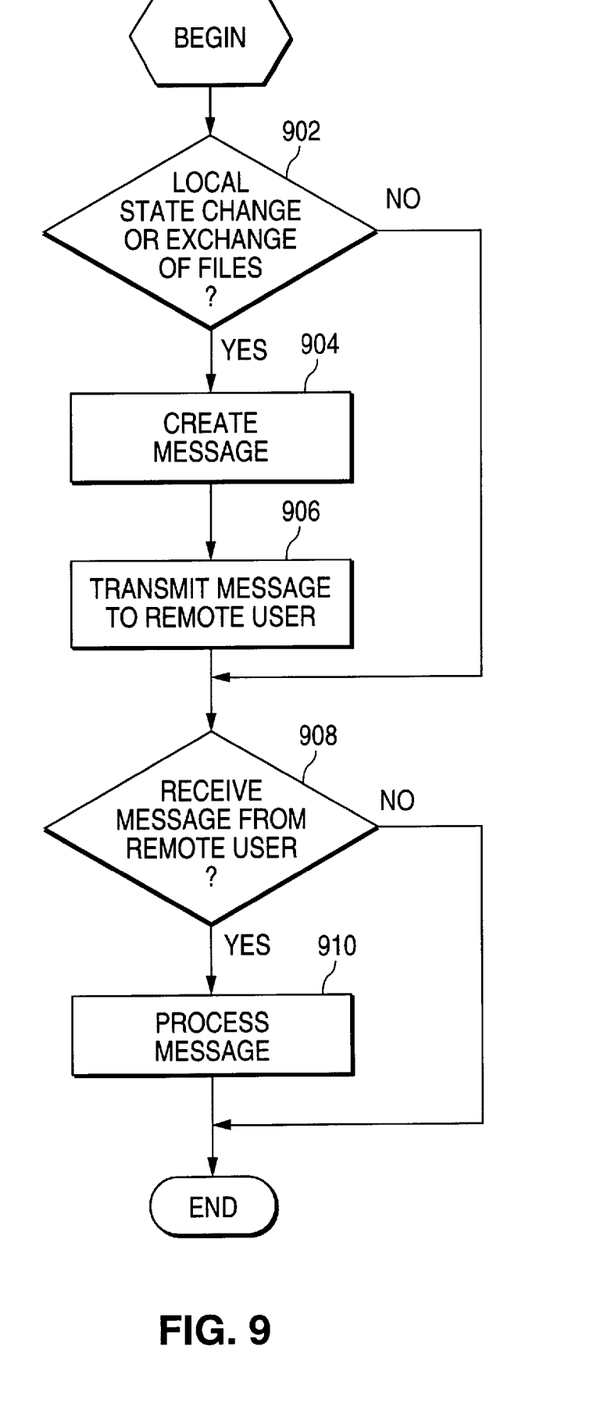
FIG. 9 is a flow diagram of the execution of an MUI protocol for multimedia communication in accordance with one embodiment of the present invention.

FIG. 9 is a flow diagram of the execution of an MUI protocol for multimedia communication in accordance with on embodiment of the present invention. Execution of the MUI protocol for multimedia communication begins at stage 902 (it is assumed that multi-user communication channels were previously established). At stage 902, the local machine determines whether there is a change in local state, such as the local user modified a shared scene, or whether the local user wants to execute an exchange of files with the remote user. If so, execution proceeds at stage 1604. Otherwise, execution continues at stage 908. At stage 904, the local machine creates a message. For example, the message class of the local MUI API instantiates a message that includes a new media object and control information, which indicates the location of the new media object in a scene that is shared by the local machine and the remote machine. A variety of messages can be created for various forms of MUI, which may also be application specific. At stage 906, the local machine transmits the message to the remote user's machine or remote users' machines. At stage 908, whether the local machine has received any messages from the remote user(s) is determined. If so, execution proceeds to stage 910. Otherwise, execution terminates. At stage 910, the local machine processes the message. For example, the message handler class of the remote MUI API instantiates the message, and then uses methods of the instantiated message to read the message, and execute any tasks to be performed, such as updating a local scene if the message includes an update to the shared scene. In one embodiment, execution of stages 902 through 910 are implemented using multimedia subsystem 206.

Although particular embodiments of the present invention have been shown and described, it will be apparent to those of ordinary skill in the art that changes and modifications can be made without departing from the present invention in its broader aspects. For example, a variety of programming languages can be used instead of or in combination with the JAVA programming language, such as the well-known C++ programming language. Also, the present invention can be used with a variety of multimedia communication environments, such as the well-known VRML or Living Worlds environment. For example, the above-described MUI protocol Fan also be applied to exchange media formats other than the MPEG-4 media format by modifying the readArguments method of the message class and multiAgent Connection method of the message handler class. Therefore, the pending claims are to encompass within their scope all such changes and modifications that fall within the true scope of the present invention.

What is claimed is:

1. A process for multi-user interaction for multimedia communication, the process comprising:

generating a message in response to a change in a local scene displayed on a local user machine, the message comprising object-based media data; and transmitting the message to a remote user machine to change a remote scene displayed on the remote user machine, the message containing information to modify the remote scene to reflect the change in the local scene using the object-based media data.

2. The process of claim 1 further comprising:

instantiating the message on the local user machine using a message class, wherein the message class comprises multiple messages of variable types.

3. The process of claim 2 further comprising:

constructing the message on the remote user machine using a message handler class.

4. The process of claim 3 further comprising:

reading an argument of the message using a read arguments method of the message class.

5. The process of claim 4 further comprising:

establishing a multi-agent connection for multi-user interaction.

6. The process of claim 5 wherein the message class and the message handler class are implemented in a JAVA programming language.

7. An article of manufacture for a computer-readable medium for multi-user interaction in multimedia communication, the article of manufacture comprising:

instructions for generating a message in response to a change in a local scene displayed on a local user machine, the message comprising object-based media data; and instructions for transmitting the message to a remote user machine to change a remote scene displayed on the remote user machine, the message containing information to modify the remote scene to reflect the change in the local scene using the object-based media data.

8. The article of manufacture of claim 7 further comprising:

a message class, the message class instantiating the message on the local user machine, wherein the message class comprises multiple messages of variable types.

9. The article of manufacture of claim 8 further comprising:

a message handler class, the message handler class constructing the message on the remote user machine.

10. The article of manufacture of claim 9 wherein the message class further comprises:

a read arguments method, the read arguments method reading an argument of the message.

11. The article of manufacture of claim 10 wherein the message handler class further comprises:

a multi-agent connection method, the multi-agent connection method establishing a connection between the local user machine and the remote user machine for multi-user interaction.

12. The article of manufacture of claim 11 wherein the message class and the message handler class are implemented in a JAVA programming language.

13. The article of manufacture of claim 7 further comprising:

instructions for generating a state message in response to a change in state of the local scene displayed at the local user machine, wherein the state message is transmitted to the remote user machine.

14. The article of manufacture of claim 7 further comprising:

instructions for dynamically constructing a received message at the local user machine, wherein the received message was transmitted from the remote user machine, and the received message comprises object-based media data.

15. The article of manufacture of claim 7 wherein the message further comprises state or control information.

16. A machine for multi-user interaction for multimedia communication, the machine comprising:

a viewing device to display a local scene;

a message manager operatively coupled to the viewing device, the message handler configured to generate a message in response to a change in the local scene displayed on the viewing device, the message comprising object-based media data and information to modify a remote scene displayed at a remote user machine in accordance to the change in the local scene, the message manager further configured to transmit the message to the remote user machine; and a microprocessor operatively coupled to the viewing device, the microprocessor configured to execute the message manager to implement the multi-user interaction.

17. The machine of claim 16 further comprising:

a message class executed on the microprocessor, the message class instantiating the message, wherein the message class comprises multiple messages of variable types.

18. The machine of claim 17 further comprising:

a message handler class executed on the microprocessor, the message handler class constructing a receives message, the received message comprising a media object, wherein the media object is used to modify the local scene displayed on the viewing device to reflect a change in the remote scene displayed at the remote user machine.

19. The machine of claim 18 further comprising:

instructions for generating a state message executed on the microprocessor, wherein the state message is transmitted to the remote user machine in response to a change in state of the local scene, and wherein the local scene coincides with the remote scene displayed at the remote user machine.

20. The machine of claim 19 wherein the machine and the remote user machine are in data communication via an Internet.

21. An article of manufacture for a data signal in a carrier wave for multi-user interaction for multimedia communication, the data signal comprising:

an object-based media message, the object-based media message including information to modify a remote scene displayed at a remote machine in accordance to a change in a local scene displayed at a local machine, the object-based media message comprising object-based media data of the local scene; and a network address of the remote machine, wherein the object-based media message is transmitted to the remote machine using a message agent at the local machine.

22. The article of manufacture of claim 21 further comprising:

a control message, the control message comprising control information, wherein the control message is transmitted to the remote machine, and the control information indicates location of the object-based media data in the remote scene, the local scene and the remote scene being a shared scene.

23. The article of manufacture of claim 22 further comprising:

a state message, the state message comprising change in state information generated by a state agent at the local machine, wherein the state message is transmitted to the remote machine, and the state information indicates a change in state of the local scene.

24. The article of manufacture of claim 23 wherein the local machine and the remote machine are in data communication via an Internet.

25. The article of manufacture of claim 24 wherein the object-based media message, the control message, and the state message each comprise a unique message object dynamically instantiated by a message class of the local machine, the message class comprising multiple messages of variable types.

26. The article of manufacture of claim 25 wherein the message class is implemented using a JAVA programming language.

27. The article of manufacture of claim 25 wherein the object-based media message is processed by the remote machine using a message handler class, the message handler class being implemented using a JAVA programming language.

* * * * *